(12) United States Patent
Togo et al.

(10) Patent No.: US 12,334,555 B2
(45) Date of Patent: Jun. 17, 2025

(54) NON-AQUEOUS ELECTROLYTE SECONDARY BATTERY

(71) Applicant: Panasonic Intellectual Property Management Co., Ltd., Osaka (JP)

(72) Inventors: Masakazu Togo, Osaka (JP); Yoshinori Aoki, Osaka (JP); Takeshi Ogasawara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 621 days.

(21) Appl. No.: 17/777,475

(22) PCT Filed: Sep. 17, 2020

(86) PCT No.: PCT/JP2020/035248
§ 371 (c)(1),
(2) Date: May 17, 2022

(87) PCT Pub. No.: WO2021/100305
PCT Pub. Date: May 27, 2021

(65) Prior Publication Data
US 2022/0407062 A1     Dec. 22, 2022

(30) Foreign Application Priority Data
Nov. 19, 2019  (JP) ................ 2019-208846

(51) Int. Cl.
H01M 4/525     (2010.01)
H01M 4/02      (2006.01)

(52) U.S. Cl.
CPC ...... *H01M 4/525* (2013.01); *H01M 2004/027* (2013.01); *H01M 2004/028* (2013.01)

(58) Field of Classification Search
CPC .................. H01M 4/131; H01M 4/525
See application file for complete search history.

(56) References Cited

U.S. PATENT DOCUMENTS 8,986,884 B2    3/2015  Nagai
2003/0031930 A1  2/2003  Hamano et al.
(Continued)

FOREIGN PATENT DOCUMENTS

JP    2003-100295 A    4/2003
JP    2006-302880 A    11/2006
(Continued)

OTHER PUBLICATIONS

International Search Report dated Dec. 1, 2020, issued in counterpart International Application No. PCT/JP2020/035248, with English Translation. (5 pages).
(Continued)

*Primary Examiner* — Brian R Ohara
*Assistant Examiner* — Brent C Thomas
(74) *Attorney, Agent, or Firm* — WHDA, LLP

(57) ABSTRACT

In this non-aqueous electrolyte secondary battery: a positive electrode active material contains a lithium transition metal oxide that has a layered structure including a Li layer and that contains at least prescribed amounts of Ni, Ca, and Al; the proportion of metal elements, excluding Li, in the Li layer is 0.6-2.0 mol % with respect to the total number of moles of metal elements, excluding Li, contained in the lithium transition total oxide; a negative electrode active material has a coating containing Ca on the surface thereof; and the contained amount of Ca in the coating is not less than 15 mass ppm but less than 80 mass ppm with respect to the total mass of the positive electrode material.

3 Claims, 1 Drawing Sheet

(56) References Cited

U.S. PATENT DOCUMENTS

| | | |
|---|---|---|
| 2008/0090150 A1 | 4/2008 | Nakura |
| 2009/0035659 A1* | 2/2009 | Takeuchi .............. H01M 4/525 |
| | | 252/519.15 |
| 2013/0136988 A1 | 5/2013 | Tanaka et al. |
| 2018/0090782 A1 | 3/2018 | Choi et al. |
| 2018/0254516 A1 | 9/2018 | Han et al. |

FOREIGN PATENT DOCUMENTS

| | | |
|---|---|---|
| JP | 2013-30284 A | 2/2013 |
| JP | 2014-049390 A | 3/2014 |
| JP | 5615926 B2 | 10/2014 |
| JP | 5682796 B2 | 3/2015 |
| JP | 2018-517243 A | 6/2018 |
| JP | 2018-129221 A | 8/2018 |
| JP | 2018-530122 A | 10/2018 |

OTHER PUBLICATIONS

The Extended European Search Report dated Nov. 3, 2022, issued in the corresponding European Patent Application No. 20890147.0. (7 pages).
Office Action dated Sep. 16, 2022, issued in counterpart IN application No. 202247028553. (6 pages).

* cited by examiner

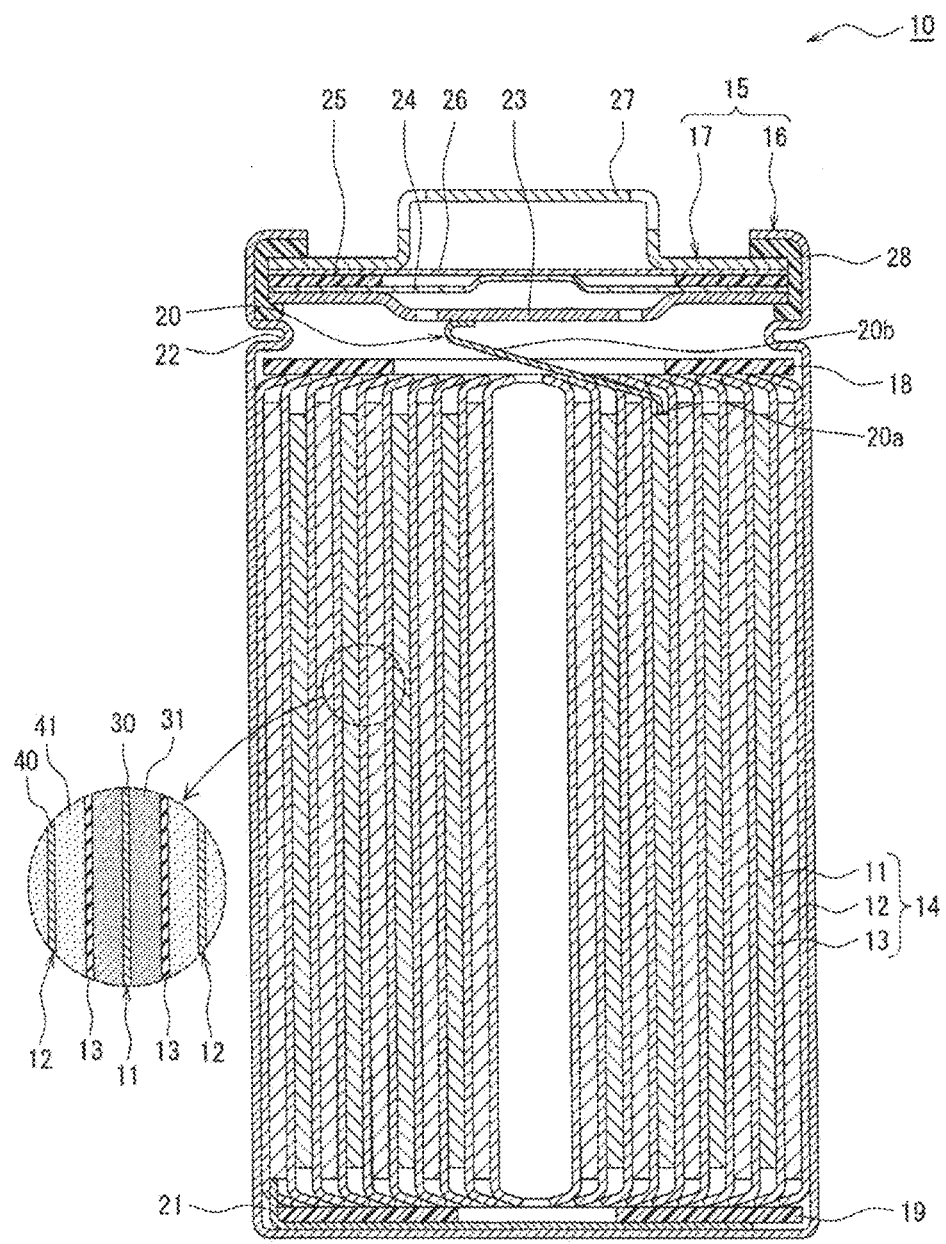

NON-AQUEOUS ELECTROLYTE SECONDARY BATTERY

TECHNICAL FIELD

The present disclosure relates to a non-aqueous electrolyte secondary battery.

BACKGROUND ART

In recent years, lithium transition metal oxides with high Ni content have attracted attention as positive electrode active materials having a high energy density. Patent Literature 1 discloses, for example, a positive electrode active material for non-aqueous electrolyte secondary batteries that is composed of a lithium transition metal oxide represented by the formula: $Li_xNi_yCo_zM_mO_2$ where M is an element selected from Ba, Sr, and B, and $0.9 \leq x \leq 1.1$, $0.5 \leq y \leq 0.95$, $0.05 \leq z \leq 0.5$, and $0.0005 \leq m \leq 0.02$, and has a BET specific surface area of 0.8 m²/g or smaller.

Moreover, Patent Literature 2 discloses a positive electrode active material for non-aqueous electrolyte secondary batteries, having an α-NaFeO₂ structure and including one or two more selected from the group consisting of Mn, Ni, and Co as transition metal elements, wherein an alkaline earth metal and W are present on a particle surface of the lithium transition metal oxide.

CITATION LIST

Patent Literature

PATENT LITERATURE 1: Japanese Unexamined Patent Application Publication No. 2003-100295
PATENT LITERATURE 2: Japanese Unexamined Patent Application Publication No. 2018-129221

SUMMARY

When using a lithium transition metal oxide with high Ni content for a positive electrode active material for non-aqueous electrolyte secondary batteries, a larger amount of Li is extracted upon charge, therefore causing a problem of deformation of the layered crystal structure when carrying out repeated charge/discharge, and reducing a battery capacity. The technologies disclosed in Patent Literatures 1 and 2 still have room for improvement in charge/discharge cycle characteristics.

The non-aqueous electrolyte secondary battery in an aspect of the present disclosure comprises a positive electrode including a positive electrode active material, a negative electrode including a negative electrode active material, and a non-aqueous electrolyte. The positive electrode active material includes a lithium transition metal oxide having a layered structure including a Li layer in which Li reversibly moves in and out, and including at least Ni, Ca and Al; in the lithium transition metal oxide, content of Ni is 80 mol % or more and 95 mol % or less relative to a total amount of metal elements excluding Li; content of Ca is more than 0 mol % and 3 mol % or less relative to the total amount of metal elements excluding Li; content of Al is more than 0 mol % and 8 mol % or less relative to the total amount of metal elements excluding Li; a proportion of metal elements excluding Li present in the Li layer is 0.6 mol % or more and 2.0 mol % or less with respect to a total number of moles of metal elements excluding Li included in the lithium transition metal oxide; the negative electrode active material comprises a film including Ca on the surface thereof; and a proportion of Ca in the film is 15 ppm by mass or more and less than 80 ppm by mass relative to a total mass of the positive electrode active material.

According to the non-aqueous electrolyte secondary battery in an aspect of the present disclosure, it is possible to inhibit reduction in a battery capacity accompanying charge/discharge while retaining a high capacity. The positive electrode active material includes a lithium transition metal oxide with high Ni content, and can provide a non-aqueous electrolyte secondary battery excellent in charge/discharge cycle characteristics.

BRIEF DESCRIPTION OF DRAWING

FIG. 1 is a cross sectional view of the non-aqueous electrolyte secondary battery according to an example of an embodiment.

DESCRIPTION OF EMBODIMENTS

In the layered structure of the lithium transition metal oxide included in the positive electrode active material, a transition metal layer such as Ni, a Li layer, and an oxygen layer are present, and the Li ions present in the Li layer reversibly move in and out, allowing a charge/discharge reaction of the battery to proceed. Using the lithium transition metal oxide with high Ni content may result in collapsing the layered structure and reducing a battery capacity because a large amount of Li ions are extracted out of the Li layer upon charge of the battery. In particular, the surface of the lithium transition metal oxide is highly active, and the layered structure is more prone to instability, facilitating degradation of the layered structure. Moreover, as in the positive electrode, the negative electrode active material and the electrolyte react in the negative electrode as well, which may alter a surface portion of the negative electrode active material.

Therefore, the present inventors have found, as a result of diligent investigation for solving the above problems, that adding a predetermined amount of Ca to a lithium transition metal oxide including Ni and Al, and substituting a portion of Li in the Li layer with other metal elements specifically improves charge/discharge cycle characteristics. Herein, it has been found that supply of Ca to the negative electrode from the positive electrode forms a film on the surface of the negative electrode active material, exhibiting the aforementioned effect when the concentration of Ca in the film is within a predetermined range. It is presumed that the structural stabilization of the Li layer by the substitution with other metal elements, stabilization of the transition metal layer by Al substitution, modification of the surface of the positive electrode active material by addition of Ca, and formation of a high quality film including Ca on the negative electrode active material have inhibited a secondary reaction between the positive electrode active material/negative electrode active material and the electrolytic solution and created a specific synergistic effect, leading to a significant improvement in the charge/discharge cycle characteristics.

An example of the embodiment of the non-aqueous electrolyte secondary battery according to the present disclosure will be described in detail below. In the following, a cylindrical battery in which a wound electrode assembly is housed in a cylindrical battery case is illustrated, however, the electrode assembly is not limited to the wound type, and a plurality of positive electrodes and a plurality of negative electrodes may be alternately stacked one by one with separators interposed therebetween. Further, the battery case is not limited to a cylindrical shape, and may be, for example, a square shape, or a coin shape, or may be a battery case formed of a laminated sheet including a metal layer and a resin layer.

FIG. 1 is a sectional view of a non-aqueous electrolyte secondary battery 10 according to an example of an embodiment. As illustrated in FIG. 1, non-aqueous electrolyte secondary battery 10 comprises an electrode assembly 14, a non-aqueous electrolyte (not shown), and a battery case 15 that houses electrode assembly 14 and the non-aqueous electrolyte. Electrode assembly 14 has a wound structure in which a positive electrode 11 and a negative electrode 12 are wound via a separator 13. Battery case 15 is composed of a bottomed cylindrical outer can 16 and a sealing assembly 17 that clogs up the opening of an outer can 16.

Electrode assembly 14 is composed of long positive electrode 11, long negative electrode 12, two long separators 13, a positive electrode tab 20 joined to positive electrode 11, and a negative electrode tab 21 joined to negative electrode 12. Negative electrode 12 is formed to have a size one size larger than that of positive electrode 11 in order to prevent lithium from precipitation. Namely, negative electrode 12 is formed longer than positive electrode 11 in the longitudinal direction and the width direction (short direction). Two separators 13 are formed to have sizes at least one size larger than a size of positive electrode 11, and are arranged to sandwich positive electrode 11, for example.

Non-aqueous electrolyte secondary battery 10 comprises insulating plates 18 and 19 arranged above and below electrode assembly 14, respectively. In the example shown in FIG. 1, positive electrode tab 20 attached to positive electrode 11 extends to the sealing assembly 17 side through the throughhole of insulating plate 18, and negative electrode tab 21 attached to negative electrode 12 passes through the outside of insulating plate 19 and extends to the bottom side of outer can 16. Positive electrode tab 20 is connected to the lower surface of a bottom plate 23 of sealing assembly 17 by welding or the like, and a cap 27 of sealing assembly 17 electrically connected to bottom plate 23 serves as a positive electrode terminal. Negative electrode tab 21 is connected to the inner surface of the bottom of outer can 16 by welding or the like, and outer can 16 serves as a negative electrode terminal.

Outer can 16 is, for example, a bottomed cylindrical metal container. A gasket 28 is arranged between outer can 16 and sealing assembly 17, and seals the internal space of battery case 15. Outer can 16 has a grooved portion 22 that supports sealing assembly 17, which is formed by pressing, for example, the side surface portion from the outside. Grooved portion 22 is preferably formed in an annular shape along the circumferential direction of outer can 16, and supports sealing assembly 17 on the upper surface of the grooved portion.

Sealing assembly 17 has a structure in which bottom plate 23, a lower vent member 24, an insulating member 25, an upper vent member 26, and cap 27 are stacked in this order from the electrode assembly 14 side. Each member constituting sealing assembly 17 has, for example, a disk shape or a ring shape, and each member except insulating member 25 is electrically connected to each other. Lower vent member 24 and upper vent member 26 are connected to each other at the central portion thereof, and insulating member 25 is interposed between the peripheral portions of each member. When the internal pressure of the battery rises due to abnormal heat generation, lower vent member 24 is deformed and broken so as to push upper vent member 26 toward the cap 27 side, and the current path between lower vent member 24 and upper vent member 26 is cut off. When the internal pressure further rises, upper vent member 26 is broken and a gas is discharged from the opening of cap 27.

Hereinafter, positive electrode 11, negative electrode 12, separator 13, and the non-aqueous electrolyte, constituting non-aqueous electrolyte secondary battery 10, will be described in detail, and in particular, the positive electrode active material included in a positive electrode mixture layer 31 forming positive electrode 11 will be described in detail.

[Positive Electrode]

A positive electrode 11 has a positive electrode current collector 30 and a positive electrode mixture layer 31 formed on both sides of positive electrode current collector 30. As positive electrode current collector 30, a foil of a metal such as aluminum or an aluminum alloy that is stable in the potential range of positive electrode 11 or a film or the like in which the metal is arranged on the surface layer, can be used. Positive electrode mixture layer 31 includes the positive electrode active material, a conductive agent, and a binder. The thickness of positive electrode mixture layer 31 is, for example, 10 μm to 150 μm on one side of positive electrode current collector 30. Positive electrode 11 can be fabricated by coating a surface of positive electrode current collector 30 with a positive electrode slurry including the positive electrode active material, the conductive agent, the binder, etc., drying the coating film, and then compressing it to form positive electrode mixture layer 31 on both sides of positive electrode current collector 30.

The conductive agent included in positive electrode mixture layer 31 that is carbon materials, such as carbon black, acetylene black, Ketjen black, and graphite, can be exemplified. As the binder included in positive electrode mixture layer 31, fluororesins such as polytetrafluoroethylene (PTFE) and polyvinylidene difluoride (PVdF), polyacrylonitrile (PAN), polyimides, acrylic resins, polyolefins, etc., can be exemplified. These resins may be combined for use with carboxymethyl cellulose (CMC) or a salt thereof, polyethylene oxide (PEO), or the like.

The positive electrode active material is included in positive electrode mixture layer 31 of positive electrode 11. The positive electrode active material includes a lithium transition metal oxide having a layered structure including a Li layer in which Li reversibly moves in and out, and including at least Ni and Ca. Examples of the layered structure of the lithium transition metal oxide include a layered structure belonging to a space group R-3m and a layered structure belonging to a space group C2/m. Among them, the layered structure belonging to a space group R-3m is preferred in terms of increasing capacity, stability of crystal structure, etc. The positive electrode active material may be mainly composed of the lithium transition metal oxide, and substantially composed only of the lithium transition metal oxide. The positive electrode active material may include a composite oxide other than the lithium transition metal oxide or other compound to the extent that the purpose of this disclosure is not impaired.

The lithium transition metal oxide is, for example, a secondary particle formed by aggregating a plurality of primary particles. The particle size of the primary particle constituting the secondary particle is, for example, 0.05 μm to 1 μm. The particle size of the primary particle is measured as a diameter of a circumscribed circle in the particle image observed by a scanning electron microscope (SEM). The lithium transition metal oxide is a particle having a volume-based median diameter (D50) of, for example, 3 μm to 30 μm, preferably 5 μm to 25 μm, and particularly preferably 7

μm to 15 μm. D50 refers to a particle size in which a cumulative frequency is 50% from the smallest particle size in a volume-based particle size distribution and is also called a median diameter. The particle size distribution of the lithium transition metal oxide can be measured by using a laser diffraction type particle size distribution measuring apparatus (for example, MT3000II manufactured by MicrotracBEL Corp.) and water as a dispersion medium.

In the lithium transition metal oxide, the content of Ni is 80 mol % or more and 95 mol % or less relative to the total amount of metal elements excluding Li and suitably 85 mol % or more and 92 mol % or less. The content of Ni of 80 mol % or more allows a battery of high energy density to be obtained. On the other hand, if the content of Ni exceeds 95 mol %, the content of Ca and other metal elements is so low that the stability of the layered structure of the lithium transition metal oxide cannot be ensured, and the erosion of the particle surface cannot be inhibited.

In the lithium transition metal oxide, the content of Ca is more than 0 mol % and 3 mol % or less relative to the total amount of metal elements excluding Li, and suitably 1 mol % or less. Ca has an effect of inhibiting an erosion of the surface of the lithium transition metal oxide by the electrolyte due to the electronic interaction thereof, and the presence of Ca is presumed to improve the cycle characteristics of the battery. Ca in the lithium transition metal oxide is, for example, Ca or a compound including Ca. CaO can be exemplified as the compound including Ca.

Ca is preferably present on the particle surface or in the vicinity thereof of the lithium transition metal oxide, and, for example, in the vicinity region of the surface within 30 nm from the particle surface. Since the lithium transition metal oxide is generally a secondary particle formed by aggregating a plurality of primary particles, Ca is preferably present in a higher concentration on the surface and in the vicinity of the surface of the primary particle, including the surface of the secondary particle, rather than in the center of the primary particle. Namely, Ca is unevenly distributed on and in the vicinity of the surface of primary particle of the lithium transition metal oxide, and the content of Ca per unit volume is higher on the surface than inside the primary particle. Ca may be present, for example, as a compound on the particle surface or within the layered structure of the lithium transition metal oxide. A distribution of Ca in the lithium transition metal oxide can be analyzed with TEM-EDX or the like.

Content of Al in the lithium transition metal oxide is more than 0 mol % and 8 mol % or less relative to the total amount of metal elements excluding Li, and suitably 2 mol % or more and 6 mol % or less. Since Al does not change in oxidation number even during charge/discharge, inclusion of Al in the transition metal layer is presumed to stabilize the structure of the transition metal layer. However, if the content of Al exceeds 8 mol %, Al impurities are generated and the battery capacity is reduced. Al may be uniformly dispersed, for example, in the layered structure of the lithium transition metal oxide, or else may be present in a portion of the layered structure. Al may also be copresent with Ca on the particle surface and in the vicinity thereof of the lithium transition metal oxide, for example, in the surface vicinity region within 30 nm from the particle surface. Al in lithium transition metal oxide may be present as Al or a compound including Al, or a compound including Ca and Al. As the compound including Al, $Al_2O_3$ can be exemplified. Moreover, as the compound including Ca and Al, $Ca_3Al_2O_6$ can be exemplified.

An example of a suitable lithium transition metal oxide is a composite oxide represented by the formula $Li_aNi_xAl_yM_zCa_wO_{2-b}$ wherein $0.95<a<1.05$, $0.80\leq x\leq 0.95$, $0\leq y\leq 0.08$, $0\leq z\leq 0.1$, $0<w\leq 0.03$, $0\leq b<0.05$, $x+y+z+w=1$, and M is at least one element selected from the group consisting of Co, Mn, Fe, Ti, Si, Nb, Zr, Mo and Zn. M preferably includes at least one of Co and Mn. The lithium transition metal oxide may include at least one of Co and Mn and include at least one metal element selected from the group consisting of Fe, Ti, Si, Nb, Zr, Mo, and Zn. A molar fraction of the metal elements included in all the particles of the lithium transition metal oxide can be measured by an inductively coupled plasma atomic emission spectroscopic apparatus (ICP-AES), electron beam microanalyzer (EPMA), energy dispersive X-ray analyzing apparatus (EDX), etc.

In the layered structure of lithium transition metal oxide, a transition metal layer such as Ni, a Li layer, and an oxygen layer are present, and the Li ions present in the Li layer reversibly move in and out, allowing a charge/discharge reaction of the battery to proceed. A proportion of metal elements excluding Li present in the Li layer is 0.6 mol % or more and 2.0 mol % or less, preferably 0.7 mol % or more and 1.9 mol % or less, and more preferably 0.8 mol % or more and 1.8 mol % or less, with respect to the total number of mole of metal elements excluding Li included in the lithium transition metal oxide. The proportion within this range stabilizes the structure of the Li layer in the state of Li ions being extracted upon charge, improving the charge/discharge cycle characteristics. On the other hand, when the above proportion is less than 0.6 mol % or exceeds 2.0 mol %, no improvement in the charge/discharge cycle characteristics can be achieved. The metal elements excluding Li present in the Li layer are presumed to be mainly Ni, but may include other metal elements.

The proportion of metal elements excluding Li present in the Li layer is determined from Rietveld analysis on an X-ray diffraction pattern obtained from X-ray diffraction measurement of the lithium transition metal oxide. The X-ray diffraction pattern is obtained, for example, from a powder X-ray diffraction apparatus (product name "RINT-TTR", source: Cu-Kα, manufactured by Rigaku Corporation), according to a powder X-ray diffraction method under the following conditions.

Measurement range: 15 to 120°
Scanning speed: 4°/min
Analysis range: 30 to 120°
Background: B-spline
Profile function: Split pseudo-Voigt function
Binding condition: Li(3a)+Ni(3a)=1
Ni(3a)+Ni(3b)=y (y is a proportion of respective Ni contents)
ICSD No.: 98-009-4814

A Rietveld analysis software PDXL2 (manufactured by Rigaku Corporation) can be used for Rietveld analysis on X-ray diffraction patterns. It is noted that no peaks derived from calcium oxide (CaO) are preferably present in the X-ray diffraction pattern of the lithium transition metal oxide. The CaO included to the extent that it is detected in the X-ray diffraction measurement may cause reduction in a charge/discharge capacity, etc.

Next, an example of the method for producing a positive electrode active material including the lithium transition metal compound will be described.

The method for producing the positive electrode active material comprises, for example, a first step of obtaining a composite oxide including Ni and arbitrary metal elements, a second step of mixing the composite oxide obtained in the first step with a lithium compound to obtain a mixture, and a third step of calcining the mixture. In the positive electrode active material to be finally obtained, a proportion of metal elements excluding Li present in the Li layer of the layered structure is adjusted, for example, by controlling a mixing proportion of raw materials in the second step, a temperature and time of calcination in the third step, etc.

In the first step, for example, while stirring a solution of metal salts including Ni and arbitrary metal elements (Al, Co, Mn, Fe or the like), an alkaline solution such as sodium hydroxide is added dropwise, and the pH is adjusted to the alkaline side (for example, 8.5 to 12.5), to precipitate (co-precipitate) a composite hydroxide including Ni and the arbitrary metal elements, and then the composite hydroxide is calcinated to obtain a composite oxide including Ni and the arbitrary metal elements. The calcination temperature is not particularly limited, but is, for example, in the range of 300° C. to 600° C.

In the second step, the composite oxide obtained in the first step is mixed with a lithium compound and a calcium compound to obtain a mixture. Examples of the lithium compound include $Li_2CO_3$, LiOH, $Li_2O$, $LiNO_3$, $LiNO_2$, $Li_2SO_4$, $LiOH \cdot H_2O$, LiH and LiF. Examples of the calcium compound include $Ca(OH)_2$, CaO, $CaCO_3$, $CaSO_4$ and $Ca(NO_3)_2$. A mixing proportion of the composite oxide obtained in the first step to the lithium compound is, preferably, for example, a proportion such that a molar ratio of metal elements excluding Li to Li is in the range of 1:0.98 to 1:1.1, in terms of facilitating adjustment of the above parameters to the above specified range. Moreover, a mixing proportion of the composite oxide obtained in the first step to the calcium compound is, preferably, for example, a proportion such that a molar ratio of metal elements excluding Li to Ca is in the range of 1:0.0005 to 1:0.02, in terms of facilitating adjustment of the above parameters to the above specified range. In the second step, when mixing the composite oxide obtained in the first step with the lithium compound and calcium compound, some other metal raw materials may be added if necessary. The other metal raw materials are oxides or the like including metal elements other than the metal elements constituting the composite oxide obtained in the first step.

In the third step, the mixture obtained in the second step is calcinated at a predetermined temperature and time to obtain a positive electrode active material according to the present embodiment. The calcination of the mixture in the third step comprises a multi-step calcination step including, for example, a first calcination step of calcinating in a calcination furnace at a first rate of temperature rise up to a first set temperature of 450° C. to 680° C. under an oxygen stream, and a second calcination step of calcinating the calcinated product obtained in the first calcination step in a calcination furnace at a second rate of temperature rise up to a second set temperature of higher than 680° C. and 800° C. or lower under an oxygen stream. Here, the first rate of temperature rise is in the range of 1.5° C./min to 5.5° C./min, and the second rate of temperature rise that is slower than the first rate of temperature rise is in the range of 0.1° C./min to 3.5° C./min. For the positive electrode active material of the present embodiment to be finally obtained, such multi-step calcination can adjust the proportion of the metal elements excluding Li present in the Li layer to 0.6 mol % or more and 2.0 mol % or less. A plurality of the first rates of temperature rise and the second rates of temperature rise may be set for each temperature region provided that they are within the aforementioned specified ranges, respectively. The holding time of the first set temperature in the first calcination step is preferably 5 hours or shorter, and more preferably 3 hours or shorter in terms of adjusting each of the above parameters of the lithium transition metal oxide to the aforementioned specified ranges. The holding time of the first set temperature is the time for maintaining the first set temperature after reaching the first set temperature. The holding time of the second set temperature in the second calcination step is preferably 1 hour to 10 hours and more preferably 1 hour to 5 hours, in terms of adjusting each of the above parameters of the lithium transition metal oxide to the aforementioned specified ranges. The holding time of the second set temperature is the time for maintaining the second set temperature after reaching the second set temperature. When calcinating the mixture, in order to adjust each of the above parameters to the aforementioned specified ranges, for example, calcination can be carried out in an oxygen stream having an oxygen concentration of 60% or more and a flow rate of the oxygen stream being set to in the range of 0.2 mL/min to 4 mL/min per 10 $cm^3$ of the calcination furnace and 0.3 L/min or more per kg of the mixture.

[Negative Electrode]

Negative electrode 12 has a negative electrode current collector 40 and negative electrode mixture layers 41 formed on both sides of negative electrode current collector 40. As negative electrode current collector 40, a foil of a metal such as copper or a copper alloy that is stable in the potential range of negative electrode 12, or a film or the like in which the metal is arranged on the surface layer, can be used. Negative electrode mixture layer 41 includes a negative electrode active material and a binder. The thickness of negative electrode mixture layer 41 is, for example, 10 μm to 150 μm on one side of negative electrode current collector 40. Negative electrode 12 can be fabricated by coating a surface of negative electrode current collector 40 with a negative electrode mixture slurry including the negative electrode active material, the binder, etc., drying the coating film, and then rolling it to form negative electrode mixture layers 41 on both sides of negative electrode current collector 40.

The negative electrode active material included in negative electrode mixture layer 41 is not particularly limited provided that it can reversibly intercalate and de-intercalate lithium ions, and includes a carbon material such as graphite. The graphite may be any of natural graphite such as scaly graphite, massive graphite and earthy graphite, and artificial graphite such as massive artificial graphite and graphitized mesophase carbon microbeads.

The negative electrode active material comprises a film including Ca on a surface thereof. A proportion of Ca in the film is 15 ppm by mass or more and less than 80 ppm by mass relative to the total mass of the positive electrode active material. The proportion within this range improves the charge/discharge cycle characteristics.

The negative electrode active material may further include Ni in the film. Ni, for example, moves from the positive electrode, and is then supplied to the negative electrode. Ni may be preliminarily included in the negative electrode active material. A molar ratio of content of Ca to content of Ni in the film is preferably $0.5 \leq Ca/Ni \leq 1.0$. The ratio within this range further improves the charge/discharge cycle characteristics. The content of Ca and Ni in the film of the negative electrode active material can be analyzed with TEM-EDX, etc.

The negative electrode active material may include a metal such as Si or Sn that alloys with Li, a metal compound including Si, Sn or the like, a lithium titanium composite oxide, or the like. Further, such a material coated with a carbon film may be used. For example, a Si-containing compound represented by $SiO_x$ ($0.5 \leq x \leq 1.6$), a Si-containing compound in which Si fine particles are dispersed in a lithium silicate phase represented by $Li_{2y}SiO_{(2+y)}$ ($0<y<2$), or the like can be combined with graphite.

As the binder included in negative electrode mixture layer 41, a fluororesin such as PTFE or PVdF, a PAN, a polyimide, an acrylic resin, a polyolefin, or the like may be used as in the case of positive electrode 11, but styrene-butadiene rubber (SBR) is preferably used. Moreover, negative electrode mixture layer 41 may include CMC or a salt thereof, polyacrylic acid (PAA) or a salt thereof, polyvinyl alcohol (PVA), etc.

[Separator]

Separator 13 that is, for example, a porous sheet having ion permeability and insulating property, is used. Specific examples of the porous sheet include a microporous thin membrane, a woven fabric, and a non-woven fabric. As a material of separator 13, a polyolefin such as polyethylene or polypropylene, cellulose, or the like is suitable. Separator 13 may have a single-layer structure or a multilayer structure. Further, a resin layer having high heat resistance, such as an aramid resin, and a filler layer including a filler of an inorganic compound, may be disposed on a surface of separator 13.

[Non-Aqueous Electrolyte]

The non-aqueous electrolyte includes, for example, a non-aqueous solvent and an electrolyte salt dissolved in the non-aqueous solvent. As the non-aqueous solvent, for example, an ester, an ether, a nitrile such as acetonitrile, an amide such as dimethylformamide, or a mixed solvent of two or more of them can be used. The non-aqueous solvent may include a halogen-substituted derivative in which at least a portion of hydrogen in the solvent is substituted with a halogen atom such as fluorine. Examples of the halogen-substituted derivative include fluorinated cyclic carbonates such as fluoroethylene carbonate (FEC), fluorinated chain carbonates, and fluorinated chain carboxylic acid esters such as methyl fluoropropionate (FMP).

Examples of the aforementioned esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methyl propyl carbonate, ethyl propyl carbonate and methyl isopropyl carbonate, cyclic carboxylic acid esters such as γ-butyrolactone (GBL) and γ-valerolactone (GVL), and chain carboxylic acid esters such as methyl acetate, ethyl acetate, propyl acetate, methyl propionate (MP) and ethyl propionate (EP).

Examples of the aforementioned ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, crown ether, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

The electrolyte salt is preferably a lithium salt. Examples of lithium salts include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, $LiCl$, $LiBr$, $LiI$, lithium chloroborane, lithium lower aliphatic carboxylates, borates such as $Li_2B_4O_7$ and $Li(B(C_2O_4)F_2)$, and imide salts such as $LiN(SO_2CF_3)_2$ and $LiN(C_lF_{2l+1}SO_2)$ ($C_mF_{2m+1}SO_2$) wherein 1 and m are integers of 0 or more. The lithium salt may be used alone, or a plurality of types may be mixed and used. Among them, $LiPF_6$ is preferably used from the viewpoint of ionic conductivity, electrochemical stability, etc. The concentration of the lithium salt is, for example, 0.8 mol to 1.8 mol per 1 L of the non-aqueous solvent. Moreover, a vinylene carbonate or a propane sultone-based additive may be further added.

EXAMPLES

The present disclosure will be further described below with reference to Examples and Comparative Examples, but the present disclosure is not limited to the following Examples.

[Production of Positive Electrode Active Material]

Example 1

A metal composite oxide was mixed with calcium hydroxide ($Ca(OH)_2$) so that the content of Ca was 0.1 mol % relative to the total amount of Ni, Co, and Al of the metal composite oxide represented by the formula $Ni_{0.91}Co_{0.05}Al_{0.04}O_2$, and further mixed with lithium hydroxide monohydrate ($LiOH \cdot H_2O$) so that the molar ratio of the total amount of Ni, Co, Al and Ca, to Li was 1:1.02. After the mixture was calcinated from room temperature to 650° C. under an oxygen stream with an oxygen concentration of 95% (flow rate of 10 L/min per 1 kg of the mixture) at a rate of temperature rise of 2° C./min, it was calcinated by raising the temperature from 650° C. to 720° C. at a rate of temperature rise of 1° C./min. Impurities were removed from this calcinated product by washing with water to obtain the positive electrode active material of Example 1. As a result of analyzing the composition of positive electrode active material of Example 1 by using an ICP-AES, the composition was found to be $Li_{0.99}Ni_{0.909}Co_{0.05}Al_{0.04}Ca_{0.001}O_2$.

[Fabrication of Positive Electrode]

95 parts by mass of the positive electrode active material described above, 3 parts by mass of acetylene black as the conductive agent, and 2 parts by mass of polyvinylidene fluoride as the binder were mixed, and the mixture was further mixed with N-methyl-2-pyrrolidone (NMP) to prepare a positive electrode slurry. Next, the positive electrode current collector made of aluminum foil having a thickness of 15 μm was coated with the slurry, and the coating film was dried, then rolled by a rolling roller, and cut into a predetermined electrode size to obtain a positive electrode in which a positive electrode mixture layer was formed on both sides of the positive electrode core. It is noted that an exposed portion of the positive electrode core with the surface exposed was arranged on a portion of the positive electrode. Positive electrodes of other Examples and Comparative Examples were also fabricated in the same manner.

[Fabrication of Negative Electrode]

Natural graphite was used as a negative electrode active material. A negative electrode active material, sodium carboxymethyl cellulose (CMC-Na), and styrene-butadiene rubber (SBR) were mixed in an aqueous solution at a solid content mass ratio of 100:1:1 to prepare a negative electrode mixture slurry. Both sides of the negative electrode core made of copper foil were coated with the negative electrode mixture slurry, and the coating film was dried, rolled using a rolling roller, and cut to a predetermined electrode size to obtain a negative electrode in which negative electrode mixture layers were formed on both sides of the negative electrode core. It is noted that an exposed portion of the negative electrode core with the surface exposed was arranged in a portion of the negative electrode.

[Preparation of Non-Aqueous Electrolyte]

Ethylene carbonate (EC), methyl ethyl carbonate (MEC), and dimethyl carbonate (DMC) were mixed in a volume ratio of 3:3:4. A non-aqueous electrolyte was prepared by dissolving lithium hexafluorophosphate (LiPF$_6$) in the mixed solvent at a concentration of 1.2 mol/liter.

[Fabrication of Test Cell]

An aluminum lead was attached to the exposed portion of the aforementioned positive electrode and a nickel lead was attached to the exposed portion of the aforementioned negative electrode, respectively, and the positive electrode and the negative electrode were swirlingly wound with a polyolefin separator interposed therebetween and press-formed in the radial direction to fabricate a flat wound electrode assembly. This electrode assembly was housed in an outer body, the aforementioned non-aqueous electrolyte was injected, and then an opening of the outer body was sealed to obtain a test cell.

[Evaluation of Capacity Retention]

For the above test cells, the cycle tests described below were carried out. The discharge capacity of the first cycle of the cycle test and the discharge capacity of the 30th cycle were obtained to calculate the capacity retention by the following formula.

Capacity retention (%)=(30th cycle discharge capacity÷1st cycle discharge capacity)×100

<Cycle Test>

The test cell was charged at a constant current of 0.2 It under a temperature environment of 25° C. until the battery voltage reached 4.2 V, and then charged at a constant voltage of 4.2 V until the current value reached 1/100 It. Subsequently, constant current discharge was carried out with a constant current of 0.2 It until the battery voltage fell down to 2.5 V. This charge/discharge cycle was repeated 30 cycles.

Examples 2 to 6, Comparative Examples 1 to 7

Test cells were each fabricated and evaluated in the same manner as in Example 1 except the raw materials used, the compounding ratio of raw materials, and production conditions (the molar ratio of Li to the total amount of metal elements excluding Li, the calcination temperature of the second stage) were changed to synthesize a lithium transition metal oxide (positive electrode active material) with the composition shown in Table 1.

Table 1 shows the evaluation results of the capacity retention. Table 1 also shows the proportion of metal elements excluding Li present in the Li layer with respect to the total number of mole of metal elements excluding Li, the proportion of Ca included in the negative electrode active material relative to the total mass of the positive electrode active material, and the molar ratio of Ca content to Ni content in the coating film of the negative electrode active material. It is noted that for the lithium transition metal oxides in Examples and Comparative Examples, the powder X-ray diffraction measurements were carried out under the conditions previously described to obtain the X-ray diffraction patterns. From the X-ray diffraction patterns of all Examples and Comparative Examples, the diffraction lines indicating a layered structure were confirmed, and no peaks of CaO were observed.

TABLE 1

| | Production conditions | | Positive electrode active material | | | | | Negative electrode active material | | Battery performance evaluation |
|---|---|---|---|---|---|---|---|---|---|---|
| | Li/(metal elements excluding Li) | Calcination temperature of second stage (rate of temperature rise of 1° C./min) | Ni (mol %) | Ca (mol %) | Al (mol %) | Me (mol %) | Metal elements excluding Li in the Li layer (mol %) | Proportion of Ca (ppm by mass) | Ca/Ni | Capacity retention (%) |
| Example 1 | 1.02 | 650-720° C. | 90.9 | 0.1 | 4.0 | Co 5.0 | 0.7 | 46 | 0.5 | 94.1 |
| Example 2 | 1.02 | 650-720° C. | 90.5 | 0.5 | 4.0 | Co 5.0 | 0.7 | 57 | 0.9 | 93.9 |
| Example 3 | 1.02 | 650-720° C. | 90.0 | 1.0 | 4.0 | Co 5.0 | 1.0 | 65 | 0.9 | 93.6 |
| Example 4 | 1.02 | 650-720° C. | 88.0 | 3.0 | 4.0 | Co 5.0 | 1.0 | 69 | 0.9 | 90.8 |
| Example 5 | 1.02 | 650-720° C. | 91.7 | 0.1 | 5.0 | Mn 3.0 Nb 0.25 | 1.9 | 51 | 0.6 | 93.5 |
| Example 6 | 1.02 | 650-700° C. | 87.9 | 0.1 | 7.0 | Co 2.0 Ti 3.0 | 1.7 | 23 | 0.4 | 91.2 |
| Comparative Example 1 | 1.03 | 650-720° C. | 91.0 | 0.0 | 4.0 | Co 5.0 | 1.0 | — | — | 87.6 |
| Comparative Example 2 | 1.02 | 650-720° C. | 92.0 | 0.0 | 5.0 | Mn 3.0 | 1.8 | — | — | 84.5 |
| Comparative Example 3 | 1.02 | 650-720° C. | 91.7 | 0.0 | 5.0 | Mn 3.0 Nb 0.25 Mg 0.1 | 1.1 | — | — | 79.2 |
| Comparative Example 4 | 1.02 | 650-720° C. | 91.7 | 0.0 | 5.0 | Mn 3.0 Nb 0.25 Sr 0.1 | 1.7 | — | — | 84.7 |
| Comparative Example 5 | 1.03 | 650-820° C. | 85.0 | 0.0 | 0.0 | Co 10.0 Mn 5.0 | 1.8 | — | — | 83.0 |
| Comparative Example 6 | 1.02 | 650-720° C. | 91.9 | 0.1 | 5.0 | Co 0.5 Mn 2.5 | 2.2 | 28 | 0.3 | 85.0 |
| Comparative Example 7 | 1.02 | 650-720° C. | 94.0 | 3.0 | 3.0 | — | 1.9 | 103 | 1.2 | 83.6 |

As shown in Table 1, the test cells of Examples 1 to 6 exhibited higher capacity retention than any of those of Comparative Examples 1 to 7.

REFERENCE SIGNS LIST 10 non-aqueous electrolyte secondary battery
11 positive electrode
12 negative electrode
13 separator
14 electrode assembly
15 battery case
16 outer can
17 sealing assembly
18, 19 insulating plates
20 positive electrode tab
21 negative electrode tab
22 grooved portion
23 bottom plate
24 lower vent member
25 insulating member
26 upper vent member
27 cap
28 gasket
30 positive electrode current collector
31 positive electrode mixture layer
40 negative electrode current collector
41 negative electrode mixture layer

The invention claimed is:

1. A non-aqueous electrolyte secondary battery comprising:
    a positive electrode including a positive electrode active material;
    a negative electrode including a negative electrode active material; and
    a non-aqueous electrolyte, wherein
    the positive electrode active material includes a lithium transition metal oxide having a layered structure including a Li layer in which Li reversibly moves in and out, and including at least Ni, Ca and Al;
    in the lithium transition metal oxide,
    a content of Ni is 80 mol % or more and 95 mol % or less relative to a total amount of metal elements excluding Li;
    a content of Ca is more than 0 mol % and 3 mol % or less relative to the total amount of metal elements excluding Li;
    a content of Al is more than 0 mol % and 8 mol % or less relative to the total amount of metal elements excluding Li;
    a proportion of metal elements excluding Li present in the Li layer is 0.6 mol % or more and 2.0 mol % or less with respect to a total number of moles of metal elements excluding Li included in the lithium transition metal oxide;
    the negative electrode active material comprises a film including Ca on a surface thereof; and
    a proportion of Ca in the film is 15 ppm by mass or more and less than 80 ppm by mass relative to a total mass of the positive electrode active material.

2. The non-aqueous electrolyte secondary battery according to claim 1, wherein the negative electrode active material further includes Ni in the film.

3. The non-aqueous electrolyte secondary battery according to claim 2, wherein a molar ratio of a content of Ca to a content of Ni in the film is $0.5 \leq Ca/Ni \leq 1.0$.

* * * * *